United States Patent [19]

Kosanovich et al.

[11] 4,319,017
[45] Mar. 9, 1982

[54] SEMI OR FULLY CONTINUOUS PROCESS FOR POLYESTER OF BISPHENOL AND DICARBOXYLIC ACID BY TRANSESTERIFICATION POLYMERIZATION AND PRODUCT THEREOF

[75] Inventors: George M. Kosanovich, Wilson; Gideon Salee, Williamsville, both of N.Y.

[73] Assignee: Hooker Chemicals & Plastics Corp., Niagara Falls, N.Y.

[21] Appl. No.: 128,742

[22] Filed: Mar. 10, 1980

[51] Int. Cl.³ ............................................. C08G 63/22
[52] U.S. Cl. .................................. 528/176; 528/180; 528/194
[58] Field of Search ........................ 528/176, 180, 194

[56] References Cited

U.S. PATENT DOCUMENTS

| | | | |
|---|---|---|---|
| 3,299,172 | 1/1967 | Schade et al. | 260/860 |
| 3,335,111 | 8/1967 | Pray et al. | 260/47 |
| 3,370,037 | 2/1968 | Giesen et al. | 528/180 |
| 3,395,119 | 7/1968 | Blaschke et al. | 260/47 |
| 3,399,170 | 8/1966 | Blaschke et al. | 260/47 |
| 3,972,852 | 8/1976 | Inata et al. | 260/47 |
| 4,064,108 | 12/1977 | Inata et al. | 260/47 |
| 4,066,624 | 1/1978 | Kawase et al. | 264/328 |
| 4,124,566 | 11/1978 | Saiki et al. | 528/177 |
| 4,137,278 | 1/1979 | Lemper et al. | 260/860 |
| 4,154,920 | 5/1979 | Jabarin | 528/272 |

FOREIGN PATENT DOCUMENTS

| | | |
|---|---|---|
| 1228417 | 11/1966 | Fed. Rep. of Germany . |
| 2232877 | 1/1974 | Fed. Rep. of Germany . |
| 2544069 | 4/1976 | Fed. Rep. of Germany . |
| 3907 | 9/1979 | European Pat. Off. . |
| 49-82796 | 8/1974 | Japan . |
| 890432 | 2/1962 | United Kingdom . |
| 924607 | 4/1963 | United Kingdom . |

OTHER PUBLICATIONS

Ludwig, *Polyesterfasern, Chemie & Technologie*, Akademie-Verlag, Berlin, 1975, pp. 170–174.
"Luwa Polymer Technology", Trade Bulletin 115–119, Luwa Corp., Charlotte, NC.

*Primary Examiner*—Maurice J. Welsh
*Attorney, Agent, or Firm*—James F. Tao; James F. Mudd; David A. Stein

[57] ABSTRACT

Linear aromatic polyesters of bisphenols and dicarboxylic compounds are prepared by transesterification polymerization in either a fully continuous process or in a semi-continuous process wherein a first stage is conducted batchwise and a second stage is conducted in a continuous manner wherein the second stage employs a wiped film reactor. The processes are preferably conducted in the presence of a catalyst in liquid form, and further under conditions wherein the catalyst is introduced to the polymerization concurrent with the introduction of liquid phase reactants to avoid substantial heating of the reactants in contact with the catalyst prior to onset of the transesterification reaction. The products of the processes have an unexpectedly low polydispersity.

77 Claims, 3 Drawing Figures

SEMI OR FULLY CONTINUOUS PROCESS FOR POLYESTER OF BISPHENOL AND DICARBOXYLIC ACID BY TRANSESTERIFICATION POLYMERIZATION AND PRODUCT THEREOF

BACKGROUND OF THE INVENTION AND RELATIONSHIP TO THE PRIOR ART

Linear polyesters consisting essentially of residues of a bisphenol and dicarboxylic acids are important engineering thermoplastics especially noted for their excellent performance at high temperatures.

The transesterification reaction of a bisphenol and a diaryl ester of a dicarboxylic acid, preferentially in the presence of a small effective amount of a catalyst to prepare a thermoplastic linear polyester has been disclosed for example by British Pat. No. 924,607 assigned to Imperial Chemical Industries, Ltd. published Apr. 24, 1963.

The reaction, which is generally carried out in bulk, i.e. without solvent or diluent, with the reactants in molten condition generally employs temperatures in the range of above about 100° to about 400° or higher, e.g. above about 160° to about 350° C. for bisphenol A-isophthalate-terephthalate polyesters.

Since the reaction is reversible, provision is made for removal of the monohydroxy aromatic compound, e.g. phenol, displaced from the diaryl ester reactant during transesterification when a diphenyl ester is employed as the diaryl ester reactant, to cause the reaction to proceed to completion.

Monohydroxy aromatic compound removal is generally facilitated by gradually raising the temperature of the reaction mass from the minimum temperature required for onset of transesterification to about 300°–400° C. while gradually reducing the reaction pressure from about atmospheric pressure to about 0.1 mm or lower of mercury.

The viscosity of the polyester products is generally exceptionally high causing the viscosity of the reaction mass, as completion of the reaction is approached, to approach values above about $1 \times 10^6$ to above about $10.0 \times 10^6$ centipoises at reaction conditions, i.e. the range of viscosities of such polyesters as measured at shear rate of about 24 sec.$^{-1}$ and at about 320° C.

Because of the above indicated wide variance in conditions e.g. temperature and pressure, employed in the reaction and because of the necessity for wide variance in kind and degree of agitation, occasioned by the aforementioned viscosity increase during the reaction, the prior art has generally carried out the reaction in two stages, namely, a moderate temperature pre-polymerization stage, to prepare a polyester oligomer prepolymer and a subsequent polymerization stage wherein said oligomer and the reactants are condensed to provide the polyester product.

The prepolymerization stage is carried out at about 100° to about 350° C. under moderate agitation conditions to prepare a low molecular weight polyester, i.e. prepolymer or oligomer, of relatively low molecular weight, corresponding to an intrinsic viscosity of less than about 0.1 to about 0.3 dl/g.

The polymerization stage is carried out at temperatures ranging to about 400° C. employing extreme agitation conditions.

Because of difficulties in handling the aforementioned high viscosities of the molten reaction mass encountered in the transesterification reaction only batchwise mode or semi continuous mode (wherein prepolymerization is batchwise and polymerization is continuous) have been suggested for preparation of these polyesters by transesterification.

Batchwise transesterification is in general not commercially attractive for production of large scale quantities of the polyester and generally provides an undesirably wide variance of product characteristics and properties from batch to batch of product.

In batchwise transesterification processes it is generally impossible to vary substantially the product molecular weight distribution, as measured by the product's polydispersity (which is further discussed below) by change of reaction conditions.

K. Eise et al., German Preliminary Application No. 2,232,877 published Jan. 17, 1974, disclose a semi-continuous transesterification polymerization of the polyester wherein the prepolymerization stage to prepare the oligomer (referred to as precondensate in the patent) is carried out batchwise and the subsequent polymerization stage is carried out continuously employing a vented extruder reactor, i.e. an extruder having provision for removal of vapors of the phenolic side product of the reaction.

Use of the extruder in accordance with the Eise et al. patent, generally has the disadvantage that the reaction mass in the extrusion reaction vessel is in the form of a thick mass, e.g. of greater than about 20 mm. thickness, principally adhering to the screw element of the extruder.

The residence time of the reaction mass in an extruder is relatively long compared to a thin film reactor giving rise to an undesirably long thermal history to the polyester. Such a long thermal history leads to a product of greater coloration which in the case of extreme product discoloration makes the product unacceptable for many uses. Under normal operations, the rate of new face exposure is limited, thus limiting the rate at which phenol can be eliminated from the system. As a result, relatively costly expenditures of energy are necessary to remove the phenolic side product to maintain a satisfactory rate of transesterification.

As an additional alternative to overcome the aforementioned difficulties in preparation of the polyester by transesterification especially the difficulties arising from the aforementioned high melt viscosity of the bisphenol-dicarboxylic acid polyester, the prior art (for example in U.S. Pat. No. 3,399,170, F. Blachke et al. assigned to Chemiche Werke Witten A. G. issued Aug. 27, 1968) has proposed modification of the structure of the polyester by introducing residues in minor proportion of alkylene and cycloalkylene glycols e.g. ethylene glycol, polybutylene glycol, into the polyester. Such structural modification of the polyester, while lowering the melt viscosity of the polyester thereby tending to overcome the aforementioned process difficulties, results in a modified polyester product which does not possess the high temperature performance characteristics of the unmodified bisphenol-dicarboxylic acid polyesters of this invention.

According to technology developed by Teijin Co., Ltd., with respect to solid state polymerization, molecular weight build-up does occur in this method, but the method is limited to materials that do crystallize.

SUMMARY OF THE INVENTION

The improvement of the invention overcomes the aforementioned difficulties of prior art technology in the process of preparing a linear aromatic polyester by transesterification polymerization of monomer reactants consisting essentially of a bisphenol and a diaryl ester of a dicarboxylic acid in a polymerization reaction zone which comprises reacting said bisphenol and said diaryl ester in a first reaction stage of said zone to prepare a polyester oligomer, which is further polymerized in a second reaction stage of said zone to increase molecular weight thereby producing the polyester product.

According to this improvement the transesterification polymerization is carried out in the prepolymerization stage, batchwise or substantially continuously, and the transesterification polymerization is carried out in the polymerization stage, substantially continuously, with the proviso that when the polymerization in the prepolymerization stage is carried out batchwise, the polymerization reaction in the polymerization stage is carried out in a countercurrent-flow, mechanically agitated thin film reactor.

In accordance with the invention, substantially continuously means that the reactants are introduced into a particular reaction stage in substantially continuous fashion while reaction product of the reaction stage are withdrawn in substantially continuous fashion.

The countercurrent-flow, mechanically agitated, thin film reactor is defined as a reaction vessel which is equipped with a motor driven rotary screw or a rotor equipped with suitable blades, and which is known in the art for continuous processing or reaction of viscous molten materials such as polymers. As more particularly described below, the viscous material (in the present invention, the transesterification reaction mass) is transported through the vessel by rotation of the screw in the form of a thin film which principally adheres to the inner walls of the vessel as the material moves through the vessel. In the present known type of thin film reactor, the direction of movement of the material through the vessel is counter to direction of flow of gas or vapor evolved from the moving material. In the process of the invention, the vapor removed from the transesterification reaction mass is the aforementioned monohydroxy aromatic, i.e. phenolic, compound which is the side product of the transesterification reaction.

In one aspect of the invention, there is contemplated a semi-continuous process for transesterification polymerization wherein the prepolymerization stage of the process is carried out batchwise and the subsequent polymerization stage is carried out substantially continuously in one or more of the aforementioned countercurrent flow mechanically agitated thin film or wiped film reactors.

Another aspect of the invention contemplates a fully continuous transesterification polymerization wherein, the prepolymerization is carried out in one or more stirred tank reactors, and preferably, the polymerization stage is carried out in one or more of the aforementioned wiped film reactors.

It is preferred to carry out the transesterification reaction in the presence of a catalyst including acidic, neutral and especially basic catalyst for the transesterification. It is especially preferred to introduce basic catalyst in liquid form. It is also especially preferred to introduce the basic catalyst to the polymerization reaction mass concurrent with introduction of molten reactants to the pre-polymerization so as to avoid substantial heating of the reactants in contact with the catalyst prior to onset of the transesterification reaction.

The present invention provides linear aromatic polyesters consisting essentially of residues of bisphenols and dicarboxylic acids of desirable low color and high melt viscosities, e.g. of viscosities ranging from below about $1 \times 10^6$ centipoises up to about $10 \times 10^6$ centipoises or higher (as measured at a shear rate of about 24 sec.$^{-1}$ at about 320° C.) employing either semi- or fully continuous modes of reaction.

DETAILED DESCRIPTION OF THE DRAWINGS

Figure 1:
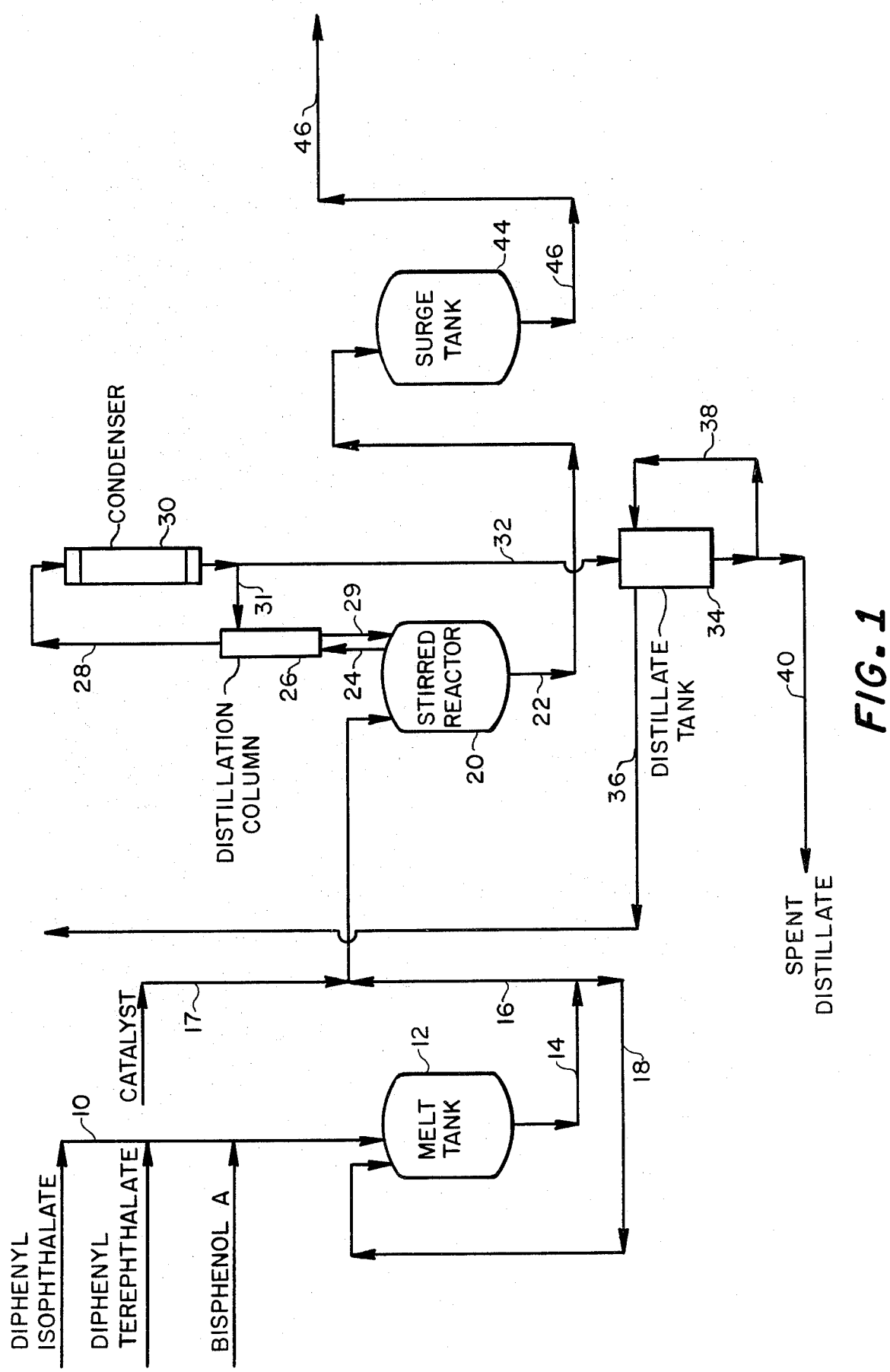
FIG. 1 of the drawing illustrates the first stage or prepolymerization stage of the aforementioned semi-continuous transesterification process of the invention.

The semi-continuous process of the invention will be described with respect to FIGS. 1 and 2 of the drawing, utilizing as typical reactants, diphenyl isophthalate, diphenyl terephthalate and bisphenol A. Referring first to FIG. 1, these reactants are introduced through conduit 10 to melt tank 12 which is maintained at about 180° C. to maintain the reactants in the molten state. Thorough mixing of the reactants can be obtained by circulating the mixture through conduits 14 and 18 and back to the melt tank 12. The mixture in the melt tank 12 is continuously purged with dry nitrogen to exclude oxygen. No significant reaction occurs at this stage.

In accordance with the semi-continuous process, a batch of the monomer mixture is transferred through conduit 16 to the stirred reactor 20. Catalyst is added directly to the stirred reactor 20 or with the molten mixture of monomers through conduit 17 so that the catalyst does not contact the molten monomers for any substantial time prior to onset of the polymerization reaction in the stirred reactor 20. The reaction is initiated by elevating the pressure and temperature in the stirred reactor 20.

The prepolymerization reaction is conducted in stirred reactor 20 to the extent that the inherent viscosity of the resulting polymer is about 0.15 to about 0.25, preferably about 0.18, which is equivalent to an extent of reaction of slightly more than 90%. This prepolymer product is transferred to the surge tank 44 in molten condition.

Phenol vapor produced in the reaction process and some unreacted monomer passes overhead from the stirred reactor 20 through conduit 24 to distillation column 26 where the overhead mixture is contacted with recycle phenol entering distillation column 26 through conduit 31. The distillation column removes any monomer entrained in the phenol vapor and returns the monomer to stirred reactor 20 through conduit 29. Phenol vapor passing overhead from the distillation column 26 passes through conduit 28 to the condenser 30. A portion of the recycled phenol is returned to distillation column 26 through conduit 31 and the remainder is passed through conduit 32 to distillate tank 34. The distillate is recirculated from tank 34 through conduit 38 and back to distillate tank 34. The vapor from the distillate tank is exhausted through conduit 36 to a freeze trap (not shown). The liquid product from the distillate tank 34 is removed from the process through conduit 40.

The prepolymer is maintained in molten condition in the surge tank 44 under a nitrogen blanket, and is continuously pumped through conduit 46 at the rate required in the subsequent polymerization stage which is operated in a continuous manner as described with reference to FIG. 2.

Figure 2:
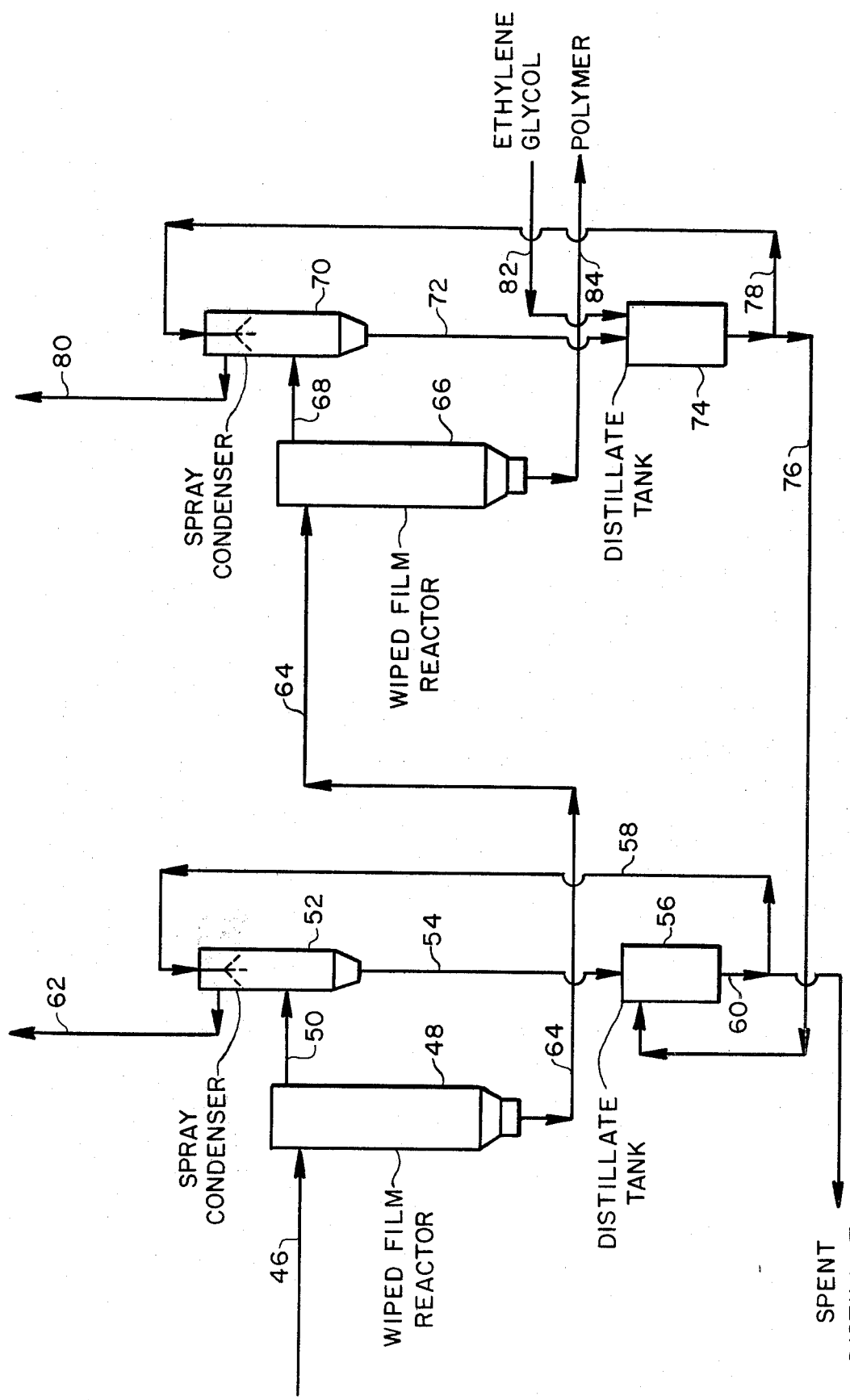
FIG. 2 of the drawing illustrates the second stage or polymerization stage of semi-continuous and fully continuous transesterification processes of the invention.

As shown in FIG. 2, molten prepolymer is introduced from conduit 46 to the top portion of wiped film reactor 48 and passes downwardly through the reaction zone in response to rotating blades (not shown) in reactor 48 which is operated in a temperature range of about 280° to 310° C. and at a pressure of about 1 to about 10 mm of mercury absolute. The polymer product from the bottom portion of reactor 48 passes through conduit 64 to the upper portion of wiped film reactor 66 and then downwardly through reactor 66 in response to the turning blades of the wiped film reactor 66. The polymer product is removed from the process through conduit 84 from the bottom portion of reactor 66.

Reactor 48 is provided with a spray condenser 52 which receives overhead vapor through conduit 50 and discharges condensed phenol through conduit 54 to distillate tank 56. The liquid effluent from distillate tank 56 is divided, and a portion is discharged from the process through conduit 60, while the remainder is recycled through conduit 58 to the top of the spray condenser 52 for contact with additional vapor entering through conduit 50 from reactor 48. The vapors from the spray condenser pass overhead through conduit 62 to a freeze trap (not shown). In a similar manner, the vapor product of reactor 66 passes through conduit 68 to spray condenser 70, from whence the condensate passes through conduit 72 to distillate tank 74. The liquid effluent from distillate tank 74 is provided with a portion being recycled to distillate tank 56 and the remainder being recycled to conduit 78 to the top of spray condenser 70 for contact with the vapor effluent from reactor 66. The overhead vapor product from the spray condenser is discharged through conduit 80 to freeze trap (not shown).

Ethylene glycol is introduced to the process through conduit 82 to the distillate tank 74 from which the ethylene glycol is recycled through conduit 78 to the top of the spray condenser 70 where the ethylene glycol assists in condensing and dissolving the phenol vapors. Additional portions of the ethylene glycol are circulated through conduit 76 to distillate tank 56 and thence through recycle conduit 58 to the top of spray condenser 52 where a similar function is served.

Figure 3:
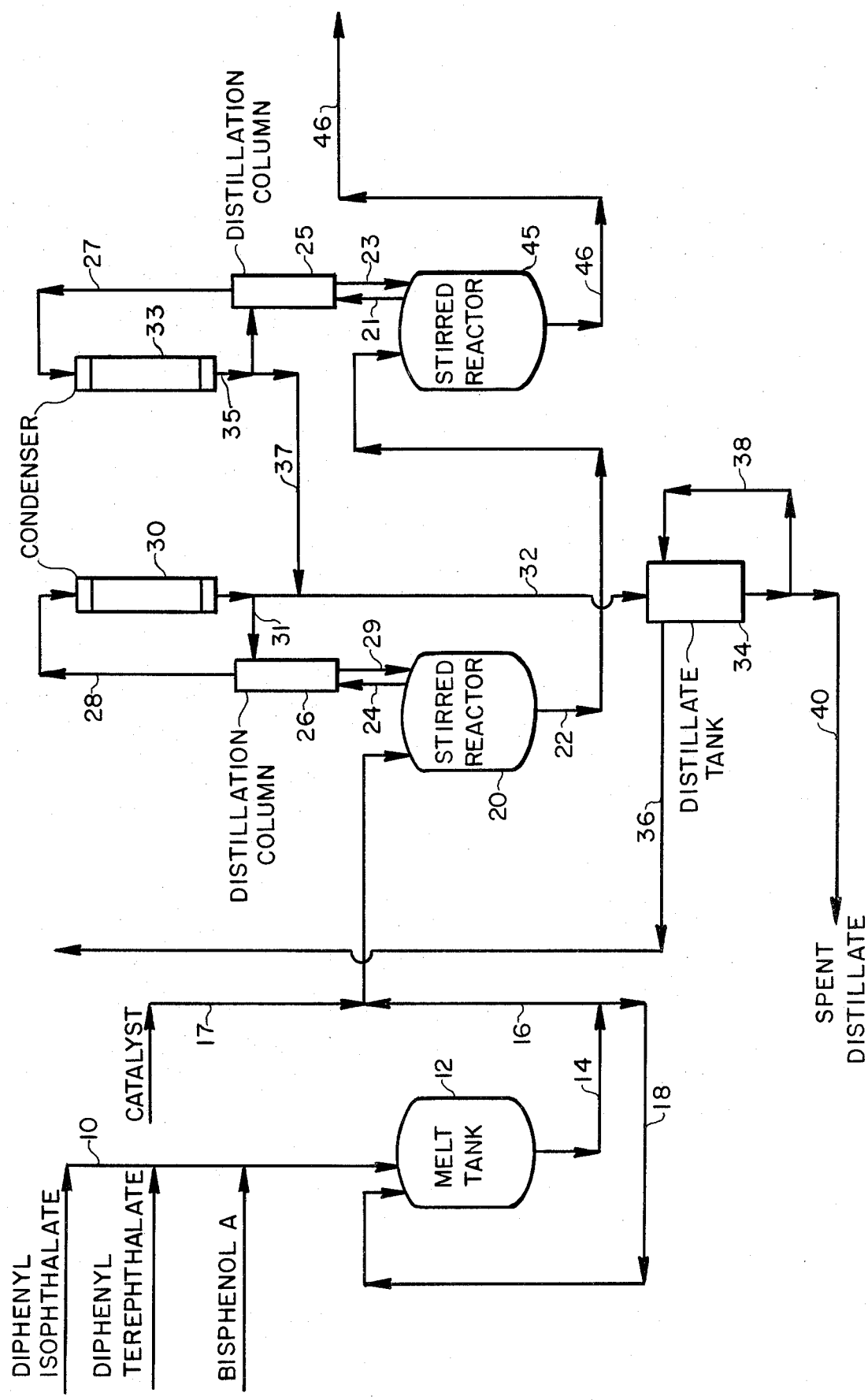
FIG. 3 of the drawing illustrates the first stage or polymerization stage of the fully continuous transesterification process of the invention.

The continuous process of the invention will be described with respect to FIGS. 2 and 3 of the drawings, utilizing as typical reactants, diphenyl isophthalate, diphenyl terephthalate and bisphenol A. Referring first to FIG. 3, these reactants are introduced through conduit 10 to melt tank 12 which is maintained at about 160° to 210° C. to maintain the reactants in the molten state. Thorough mixing of the reactants can be obtained by circulating the mixture through conduits 14 and 18 and back to the melt tank 12. The mixture in the melt tank 12 is continuously purged with dry nitrogen to exclude oxygen. No significant reaction occurs at this stage.

In accordance with the continuous process, a batch of the monomer mixture is transferred through conduit 16 to the stirred reactor 20. Catalyst is added directly to the stirred reactor 20 or with the molten mixture of monomers through conduit 17 so that the catalyst does not contact the molten monomers for any substantial time prior to onset of the polymerization reaction in the stirred reactor 20. The reaction is initiated by elevating the pressure and temperature in the stirred reactor 20.

Stirred reactor 20 is operated at a temperature of about 200° to 300° C., and from 40 to 300 mm. Hg. with one hour residence time. About 60 percent of the total amount of phenol by-product is removed from stirred reactor 20. The viscosity of the reaction mixture is generally about 1000 cp. at 240° C.

Phenol vapor produced in the reaction process and some unreacted monomer passes overhead from the stirred reactor 20 through conduit 24 to distillation column 26 where the overhead mixture is contacted with recycle phenol entering distillation column 26 through conduit 31. The distillation column removes any monomer entrained in the phenol vapor and returns the monomer to stirred reactor 20 through conduit 29. Phenol vapor passing overhead from the distillation column 26 passes through conduit 28 to the condenser 30. A portion of the recycled phenol is returned to distillation column 26 through conduit 31 and the remainder is passed through conduit 32 to distillate tank 34. The distillate is recirculated from tank 34 through conduit 38 and back to distillate tank 34. The vapor from the distillate tank is exhausted through conduit 36 to a freeze trap (not shown). The liquid product from the distillate tank 34 is removed from the process through conduits 40.

The prepolymerization reaction is continued in stirred reactor 45, which is operated at a temperature in the range of about 250° to about 300° C., and a pressure of about 10 to 50 mm. Hg. absolute has a one hour residence time. Thirty percent of the total removable phenols is removed during this step of the process to produce a reaction mixture having a melt viscosity of about 10,000 cp at 280° C. The intrinsic viscosity of the reaction mixture at this stage of the process is about 0.18 dl./g. The reaction mixture or prepolymer is removed from reactor 45 through conduit 46.

The phenol vapor produced in reactor 45 and some unreacted monomer is passed overhead in conduit 21 to distillation column 25 when the overhead mixture is contacted with recycle phenol entering distillation column 25 through conduit 35. The distillation column 25 removes any monomer entrained in the phenol vapor and returns the monomer to reactor 45 through conduit 23. Phenol vapor passing overhead from distillation 25 passes through conduit 27 to the condenser 33. A portion of the recycled phenol is returned to distillation column 25 through conduit 35 and the remainder is passed through conduit 37 and 32 to distillate tank 34 for processing as described hereinabove with respect of FIG. 1.

Referring again to FIG. 2, the prepolymerization product is continuously passed through conduit 46 to wiped film reactor 48. In reactor 48, the molten prepolymer is introduced to the top portion of the reactor and passes downwardly through the reaction zone in response to slowly rotating blades in the wiped film reactor 48 which is operated in a temperature range of about 280° to 310° C. and at a pressure of about 1 to about 10 mm of mercury absolute. The polymer product from the bottom portion of reactor 48 passes through conduit 64 to the upper portion of wiped film reactor 66, where the temperature is about 290° to 330° C. and the pressure is 0.1 to 0.5 mm Hg., and then downwardly through reactor 66 in response to the slowly turning blades of the wiped film reactor 66. The polymer product is removed from the process through conduit 84 from the bottom portion of reactor 66.

Reactor 48 is provided with a spray condenser 52 which receives overhead vapor through conduit 50 and discharges condensed phenol through conduit 54 to distillate tank 56. The liquid effluent from distillate tank 56 is processed as described with respect to the semi-continuous process. In a similar manner, the vapor product of reactor 66 passes through conduit 68 to spray condenser 70, from whence the condensate passes through conduit 72 to distillate tank 74. The liquid effluent from distillate tank 74 is processed as described with respect to the semi-continuous process.

Ethylene glycol is introduced to the process through conduit 82 to the distillate tank 74 from which the ethylene glycol is recycled through conduit 78 to the top of the spray condenser 70 where the ethylene glycol assists in condensing and dissolving the phenol vapors. Additional portions of the ethylene glycol are circulated through conduit 76 to distillate tank 56 and thence through recycle conduit 58 to the top of spray condenser 52 where a similar function is served.

DETAILED DESCRIPTION OF THE PREFERRED EMBODIMENTS OF THE INVENTION

A. Reactants

The reaction of the process of the invention employes a diester of a dicarboxylic acid and a monohydroxy aromatic compound of the benzene or naphthalene series of 6 to 20 carbon atoms.

Examples of monohydroxy aromatic compounds are disclosed in copending applications Ser. Nos. 45,461 (now issued as U.S. Pat. No. 4,255,555 on Mar. 10, 1981) and 45,464 now issued as U.S. Pat. No. 4,278,785, on July 14, 1981, both filed June 4, 1979, the disclosures of which are incorporated herein by reference. Preferred is a monohydroxy compound of the benzene series especially phenol.

The dicarboxylic acids which are useful in the process are also well known and can be represented by the formula:

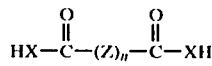

in which X is oxygen or sulfur, Z is alkylene, —Ar— or —Ar—Y—Ar— where Ar has the same definition as given with respect to the bisphenols, Y is alkylene of 1 to 10 carbons, haloalkylene, —O—, —S—, —SO—, —SO$_2$—, —SO$_3$—, —CO—, GP$>$=O or GN$>$, n is 0 or 1, and G is alkyl, haloalkyl, aryl, haloaryl, alkylaryl, haloalkylaryl, arylalkyl, haloarylalkyl, cycloalkyl, and halocycloalkyl. Illustrative aromatic and aliphatic dicarboxylic acids are disclosed in U.S. Pat. No. 4,126,602, the disclosure of which is incorporated herein by reference. Most preferably, the dicarboxylic acid component comprises a mixture of about 60 to about 100 mol percent isophthalic acid and about 40 to about 0 mol percent terephthalic acid. Diesters of an aromatic dicarboxylic acid which in general are normally solids, i.e. solids at ambient temperature, are preferably employed.

The bisphenols useful in the invention are disclosed in U.S. Pat. No. 4,126,602, the disclosure of which is incorporated herein by reference. Generally, the bisphenols which can be used in this process are known in the art and correspond to the general formula:

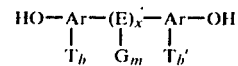

wherein Ar is aromatic, preferably containing 6–18 carbon atoms (including phenyl, biphenyl and napthyl); G is alkyl, haloalkyl, aryl, haloaryl, alkylaryl, haloalkylaryl, arylalkyl, haloarylalkyl, cycloalkyl, and halocycloalkyl; E is a divalent (or disubstituted) alkylene, haloalkylene, cycloalkylene, halocycloalkylene, arylene, or haloarylene, —O—, —S—, —SO—, —SO$_2$—, —SO$_3$—, —CO—, GP$>$=O or GN$>$; T and T' are independently selected from the group consisting of halogen such as chlorine or bromine, G and OG; m is an integer from 0 to the number of replaceable hydrogen atoms on E; b is an integer from 0 to the number of replaceable hydrogen atoms on Ar, and x is 0 or 1. When there is a plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene or 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above-described bisphenols may be employed to obtain a polymer with especially desired properties. The bisphenols generally contain 12 to about 30 carbon atoms, and preferably 12 to about 25 carbon atoms. The bisphenols and biphenols are in general normally solids. The preferred bisphenol is commonly called bisphenol A.

The conventional reaction practice for carrying out the transesterification preparation of the present polyesters is described in the aforesaid applications Ser. Nos. 45,461, and 45,464, filed June 4, 1979. There is generally employed a molar amount of dicarboxylic acid reactant, i.e. the diaryl ester, which is stoichiometrically equivalent to molar amount of the hydroxylic reactant, i.e. the bisphenol employed. If a carboxylate ester group-terminated polyester product is desired, a molar excess of diaryl ester over the hydroxylic reactant e.g. up to about 5 molar percent or more excess of the diaryl ester over the aforementioned stoichiometric equivalent proportion of diaryl ester is employed. Likewise, if a hydroxy group-terminated polyester is desired the bisphenol and any glycol modifier is charged in a similar molar excess over the aforementioned stoichiometrically equivalent proportion of the hydroxylic reactant is employed. If a specially end-capped polyarylate is desired, such as in aforesaid copending applications Ser. Nos. 45,461 and 45,464, and application Ser. No. 45,463, filed June 4, 1979 now issued as U.S. Pat. No. 4,283,523, on Aug. 11, 1981, the appropriate end-capping reagent is introduced at an appropriate time in the process.

Since one or more of the aforementioned reactants is normally a solid it is generally necessary to melt the reactants prior to introduction of the reactants to the polymerization reaction which is carried out in molten state. Normally solid reactants can be individually melted and subsequently mixed together prior to their addition to the polymerization but it is preferred to mix the reactants together and subsequently melt the reactants since the mixture of solid reactants generally melts at a temperature lower than the melting point of many individual solid reactants. Use of the latter preferred embodiment generally conserves energy employed to melt the normally solid reactants.

B. Catalyst

Also in accord with conventional transesterification reaction practice, catalyst preferably present in the transesterification reaction of the invention is an acidic neutral or basic catalyst, such classifications are based on the reaction of a conventional acid-base indicator and the catalyst when the latter is dissolved in a polar ionizing solvent such as water.

Preferably a basic catalyst is employed, such as disclosed in copending application Ser. No. 128,743, filed on even date herewith, the disclosure of which is incorporated herein by reference. Prior to its introduction into the reaction mass, the basic catalyst is preferably converted to liquid form, e.g. by melting or by dissolution in a liquid or normally solid, low melting solvent as described in the aforesaid copending application Ser. No. 128,743.

Suitable basic catalysts include the alkali metals, such as lithium, sodium, potassium, rubidium, cesium and francium; and the carbonates, hydroxides, hydrides, borohydrides, phenates, bisphenates, (i.e. salt of a bisphenol or bisphenol), carboxylates such as acetate or benzoate, oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like.

Examples of catalysts are lithium, sodium, potassium, rubidium, cesium and francium metals, potassium or rubidium carbonate, potassium hydroxide, lithium hydride, sodium borohydride, potassium borohydride, calcium acetate, magnesium acetate, aluminum tri-isopropoxide and triphenyl tin hydroxide.

Phenol is the preferred solvent for the normally solid catalysts. Substituted phenols which can be used include those having the formula

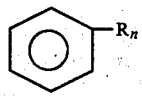

wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2.

Typical solvents include o-benzyl phenol, o-bromo phenol, m-bromo phenol, m-chloro phenol, p-chloro phenol, 2,4 dibromo phenol, 2,6 dichloro phenol, 3,5 dimethoxy phenol, o-ethoxy phenol, m-ethyl-phenol, p-ethyl-phenol, o-isopropyl phenol, m-methoxy phenol, m-propyl phenol, p-propyl phenol, and the like.

Other solvents which are particularly useful are of the ether type, for example, tetrahydrofuran and the various glymes, for example, ethylene glycol dimethylether and the like; liquid phosphites such as triphenyl phosphite and tris(nonylphenyl)phosphite, and phosphates such as trimethyl or triethyl phosphate are also useful in diluents.

Combinations of catalysts and combinations of phenols or phenols and solvents may also be used.

Especially preferred liquid basic catalysts are charged dissolved in molten normal solid-low melting organic solvent such as phenol. Especially preferred catalysts providing excellent results are the basic catalysts, rubidium phenoxide, potassium phenoxide, and potassium borophenoxide, each dissolved in molten phenol as described in the aforementioned application Ser. No. 128,743.

Preferably also when a basic catalyst is employed, the catalyst is introduced concurrently with the aforementioned molten reactants to the polymerization to avoid heating the reactants in the presence of the catalyst prior to onset of the transesterification also as described in copending application Ser. No. 128,743 filed on even date herewith.

Less preferred catalysts include the metal oxides, metal acetates, titanium and tin compounds. Suitable metal oxides include antimony trioxide, germanium oxide, arsenic trioxide, lead oxide, magnesium oxide, and zinc oxide. Suitable metal acetates include cobalt acetate, zinc acetate, cadmium acetate and manganese acetate. Suitable titanium compounds include the titanates such as tetrabutyl titanate and tetraisopropyl titanate. Suitable tin compounds include dibutyloxide, dibutyl tin methoxide and dibutyl tin dilaurate.

In accord with conventional transesterification reaction practice a catalytically effective amount is employed for example about 0.005 to about 2 mol percent or more, preferably about 0.01 to 1 mole percent on the bisphenol in accordance with known techniques of transesterification.

C. Prepolymerization Stage for Semi-continuous Transesterification

In accordance with the aforementioned semi-continuous process embodiment of the invention, in the prepolymerization stage is carried out batchwise and polymerization stage is carried out continuously. The reaction in the prepolymerization stage to pepare a polyester oligomer corresponding to an Intrinsic Viscosity in the range of less than about 0.1 to about 0.3 dl/g and a melt viscosity up to about 100,000 centipoises can be carried out conveniently in one, two, three or more reaction tanks of conventional design which have conventional agitation means and which are connected in series. Preferably a single agitated reaction tank is employed as reaction vessel for carrying out the prepolymerization reaction stage according to the semi-continuous process embodiment of the invention.

The reaction tank or tanks are equipped with distillation means for removal overhead of the phenolic compound side product of the reaction which vaporizes at the temperature of the reaction mixture. Since some of the reactants may be entrained with the phenolic side product vapor stream, the removal system for the phenolic side product desirably includes means for fractional distillation and condensation of the phenolic overhead vapor stream so as to separate, condense and return entrained monomer to the reaction mixture of the prepolymerization stage. In semi-continuous operation, the phenolic overhead vapors of the prepolymerization stage and the phenolic overhead vapors from the polymerization stage are condensed in the presence of ethylene glycol or equivalent high boiling point solvent for phenol as described below in connection with the operation of the polymerization stage of the process. The phenolic overhead streams can be combined before the condensate step. The prepolymerization stage of semi-continuous mode of carrying out the process of the invention generally includes a holding or surge tank connected in series with the aforementioned batch tank reactor or reactors. This tank, which, if desired, can be equipped with agitation means, serves to collect and hold batches of molten oligomer including unreacted molten bisphenol and diaryl ester monomer for feed on a continuous basis to the polymerization stage. Holding tank is maintained at substantially the temperature of the immediately preceeding tank to maintain the aforementioned reactants in molten state.

In the semi-continuous mode of carrying out the present invention, the prepolymerization is carried out as a batch reaction at a reaction temperature of above about 100° to about 350° C. preferably at about 160° to 330° especially at about 200° to about 300° C. under diminished pressure in the range of from about atmospheric down to about 10 mm of mercury absolute, especially down to about 1.0 mm of mercury or lower, to facilitate removal of the phenolic side product with the temperature being raised and pressure being lowered as the reaction progresses. Conveniently catalyst is added with ramping of the reaction temperatures and pressure in the batch reactor of reactors of the prepolymerization stage in accordance with the semi-continuous process embodiment of the invention.

D. Pre-polymerization Stage for Continuous Transesterification

In fully continuous operation of the prepolymerization stage the agitated reaction tanks such as were used in the batchwise mode of operation are employed for carrying out the reaction on a substantially continuous basis. Preferably two agitated tank reaction vessels in series are employed for continuous operation of the prepolymerization stage. If desired, one or all of the conventional agitated tank reactors can be replaced by a mechanically agitated thin film reactor of the type more particularly described below which operates on co-current flow basis. In fully continuous operation of the process, the prepolymerization stage preferably employs a distillative means or system for removal of the phenolic side product of the transesterification and separation of entrained monomer which is separate from that employed for the polymerization stage. In the phenolic side product distillative removal system employed for continuous prepolymerization the stream of phenolic compound vapor (containing traces of entrained monomer) from each reaction vessel of the stage passes overhead to a fractionating column which separates and returns liquid entrained monomer to the reaction vessel, while phenolic vapor flows from the fractionation column, and passes through a condenser for collection as a liquid condensate, which then flows to a freeze trap wherein it is solidified. The surge or holding tank employed at the end of the batchwise prepolymerization stage is omitted so that the oligomer and unreacted bisphenol and diaryl ester is flowed directly to the polymerization stage described hereinbelow.

Substantially similar reaction conditions to those described for the aforementioned batchwise operation of the prepolymerization are used except that ramping of the reaction temperature and pressure is desirably omitted.

E. The Polymerization Stage

One, two, three or more counter-current mechanically agitated thin film reactors in series are desirable for use in the polymerization stage of the present process which is carried out in substantially continuous fashion. As mentioned above, thin film reactors known for carrying out, on a continuous basis, reactions of viscous materials employ a rotary screw for mechanical agitation and transport of the material through the reactor as a thin film adherring to the walls of the reactor. The thin film reactors employed in invention generally provide for transport of a thin agitated film of less than about 0.1 mm to about 10 mm thickness preferably less than about 6 mm.

Mechanically agitated thin film reactors are available of appropriate construction and motor horse power capacity for reaction of materials of varying viscosities. Mechanically agitated thin film reactors of light construction and of relatively low horsepower suitable for reaction of viscous materials of relatively low viscosities up to about $0.1 \times 10^6$ centipoises are available as Viscon Polymer Machines manufactured by Luwa Corp. under the designation "MK".

Mechanically agitated thin film reactors of appropriate heavier construction and higher horsepower are available for reaction of more viscous materials, i.e. of viscosities above $0.1 \times 10^6$ centipoises are available as Filmtruder Polymer Machines manufactured and sold by Luwa Corp. under the designation "HM" (designed for use with moderately viscous material) and "HS", (designed for use with especially viscous materials.) Mechanically agitated thin film reactors of the types described above are available in designs for both counter-current and co-current removal of vapor from material which is treated in the thin film reactors. In the polymerization stage of the present process counter-current film mechanically agitated thin film reactors are employed so as to effect removal of phenolic side product countercurrent to flow of the reaction mass through the thin film reactor.

Thin film reactors, especially mechanically agitated thin film reactors (both co-current and counter-current flow types) are described and illustrated in detail in the bulletin "Luwa Polymer Technology—Luwa Polymer Machines HS-19", Luwa Corp. and F. Widmer, "The Treatment of Viscous Substances in Thin Film Apparatus", Luwa Corp. 1970.

Alternatively, but less preferably, in carrying out a fully continuous transesterification polymerization in accordance with the invention, other reactors equipped with heavy duty agitation means known in the art as suitable for treatment of highly viscous masses can be employed, such as:

A vented extruder reactor of the type described in the aforementioned German Patent Application No. 2,232,877;

A "Diskpack" polymer processor reactor as described by Z. Tadmor et al., Plastics Engineering, November 1979, pages 20-25.

In the polymerization stage of the present semi- or fully continuous transesterification process, it is preferred to employ two counter-current flow mechanically agitated thin film reactors connected in series. Preferably both of the thin film reactors are of the aforementioned high shear type. If convenient, the first thin film reactor of this stage can be of the aforementioned type suitable for handling moderately viscous materials while the second thin film reactor is of the aforementioned high shear type. In accordance with the invention, the polymerization stage of the process is in general carried out at a temperature somewhat greater than that employed in the prepolymerization in the range of about 150° to about 400° C. or higher, preferably at 225° C. to about 350° C. and especially at about 150° to about 330° C. with a reaction pressure being in the range of about 100 to about 0.1 mm of mercury absolute; the reaction temperature being raised and the reaction pressure being lowered in the course of the reaction in this stage of the process.

In accord with especially preferred operation of the process of the invention employing two thin film reactors in the polymerization stage, the first thin film reactor operates at a temperature of about 295° to about 305° C. especially at about 300° C.; at a reaction pressure of about 5 to about 15 mm of mercury absolute, especially at about 10 mm of mercury absolute, at a rate of flow of molten reaction mixture through the reactor of about 4 to 16 kilograms per hour per square meter of thin film reactor surface in the polymerization stage, especially about 8 to 12 kilograms per hour per square meter and at the screw speed of about 10 to 200 rpm, especially a screw speed that yields rotor tip speeds of about 0.5 to 1 meter per second.

In accord with foregoing especially preferred operation of the process of the invention the second thin film reactor of the polymerization stage operates at a temperature of about 280° to about 325° C., more preferably of about 300° to about 315° C. and especially of about 305°; a reaction pressure in the range of less than about 0.5 mm to about 5 mm. of mercury (absolute), preferably at less than about 0.5 to about 1.0 mm of mercury (absolute), at a rate of flow of reaction mixture substantially the same as that described for the preceeding thin film reactor of the stage, and at a screw tip speed as described above.

The final thin film reactor of the polymerization stage is desirably equipped with a heated die through which the molten polyester product is removed. Preferably the die is maintained at a temperature of about 10° C. higher than that of the thin film reactor to facilitate removal of the product from the reactor.

If desired, additional monomer reactants can be introduced to the process in the polymerization stage especially by introduction in the first reaction vessel of said stage, preferably, however, unreacted monomers present in the polymerization stage are those which have not reacted in the prepolymerization, generally amount to less than about 10% by weight of the total monomer employed by weight.

In commencing the continuous polymerization in the polymerization stage of the present process, to avoid overhead loss of oligomer, it is generally desirable to diminish the pressure in the thin film reactor or reactors gradually to reach the aforementioned reaction pressures employed in the reaction. In general in commencing the reaction in the polymerization stage it is convenient to diminish the pressure from atmospheric pressure to about 40 mm of mercury absolute at a rate of about 144 mm of mercury (absolute) per min. and subsequently to about 10 mm of mercury (absolute) at a rate of about 15 mm of mercury (absolute) per hour while heating the filled reactors to the temperature employed in the polymerization stage.

When the process of the invention is carried out as a fully continuous process, the fractional distillation means or system which is employed to remove phenolic side product vapor from the thin film reactor or reactors of this stage is desirably distinctive and separate from the corresponding fractional distillation means or system of the prepolymerization stage. It is preferred to pass the phenolic compound vapor stream which is removed overhead from each of the thin film reactor of this stage to a spray condenser operating on a circulation loop for a solvent for phenol and vapor pressure depressant such as ethylene glycol or equivalent solvent and vapor pressure depressant for the phenolic vapor. Other solvents include glycols such as diethylene glycol and higher glycols. Preferably, the glycol-circulating loops of each spray condenser operate independently of each other.

F. Products of the Invention

The processes of the invention provide products of improved, diminished color. The color of the product of the semi-continuous process of the invention is unexpected in view of the aforementioned detrimental product color results which are obtained in carrying out semi-continuous polymerization employing an extruder in the polymerization stage.

According to the aforementioned preferred embodiment of the invention which contemplates introducing a basic catalyst in liquid form to the polymerization concurrently with the liquid reactants, there is obtained unexpectedly a polyester of low polydispersity, D. D is defined by the following equation $D=(Mw/Mn)$, wherein Mw is the weight average molecular weight of the polyester product and Mn is the number average molecular weight of the polyester product. Polydispersity, also known as polydispersity index, heterogeneity ratio, non-uniformity coefficient or dispersion ratio is discussed at page 78 of F. W. Billmeyer Jr., "Textbook of Polymer Science", Second Edition, Wiley Interscience, 1971; and at page 332 of E. M. McCaffery "Laboratory Preparation for Macromolecular Chemists", McGraw-Hill Book Co., 1970.

The polydispersity of a linear condensation polymer, such as a polyester of a bisphenol and a dicarboxylic acid, is a known measure of the spread of the product molecules' molecular weight distribution. A low value in the range of above about 2.0 to about 2.3 for D indicates a narrow molecular weight distribution and is known to be characteristic of linear products of batch condensation polymerization as indicated by K. G. Denbigh, Trans. Faraday Soc. 43 648 (1947). A high value for D, e.g., ranging from about 2.5 to about 6 or higher, is known to be characteristic of linear products of continuous or semi-continuous condensation polymerization.

Unexpectedly, the polyester product of the foregoing preferred embodiment of the invention, although prepared employing a semi-continuous polyesterification reaction technique has a low polydispersity, i.e. a polydispersity indicative of a narrow molecular weight distribution, characteristic of a product of batch polymerization. The polyester product of low polydispersity obtained by the aforementioned preferred embodiment of the invention using a semi-continuous mode of reaction with addition of a liquid basic catalyst concurrent with addition of molten reactants is generally additionally characterized by enhanced impact strength, lower gel concentrations and lower free monomer concentrations, properties which heretofor could be obtained only with the corresponding polyester of low polydispersity prepared by the batch mode of transesterification polymerization. However, as is well known, batch mode phase preparation is commercially undesirable for large scale production of polymers such as the polyesters of bisphenols and dicarboxylic acid in comparison with the semi- or fully continuous polymer preparatory process.

Products of outstanding properties are also produced by the continuous transesterification polymerization process. Moreover, the continuous mode of the present process permits the product polydispersity to be varied, i.e. increased or broadened, by change of the reaction conditions in contrast to the corresponding batch process. By varying reaction conditions which affect residence time distribution of the reacting mass, the product polydispersity can be varied.

As used herein the polymer viscosities are as defined at pages 717–719 of "Encyclopedia of Polymer Science and Technology" edited by Mark and Gaylord, Volume 14, Interscience Publishers (Wiley and Sons) 1964.

ILLUSTRATIVE EXAMPLES

EXAMPLE 1

A. Catalyst Preparation

Approximately 800 cc. molten phenol is charged to a one-liter 3-necked flask, put under a blanket of dry nitrogen with mechanical agitation and heated to reflux. The phenol is distilled through a 6 inch vigreaux column at atmospheric pressure and a center cut of about 500 cc. phenol is taken.

88.1 Grams of the distilled phenol is transferred to a 250 cc. 3-necked flask with a nitrogen inlet, mechanical stirrer and a y-tube with thermometer and drying tube (filled with Drierite). The system is put under a blanket of dry nitrogen and heated to 70° C. 1.00 Gram $KBH_4$ is added. After about 20 minutes, most of the solid is in solution, the temperature is 55° C., and 3.23 grams more of $KBH_4$ is added. After two hours more, the reaction temperature is at 71° C. and the solution is clear and water-white and is allowed to cool.

B. Prepolymer Preparation 4.61 Moles (1052.5 grams) bisphenol-A, 3.46 moles (1100.6 gm) diphenyl isophthalate, and 1.15 moles (366.9 gm) diphenyl terephthalate are dried overnight in a vacuum oven at about 75° C. and several mm Hg and charged to a 5-liter resin kettle equipped with a nitrogen inlet, mechanical stirred thermometer and combination vigreaux column-distillation head with a 3-liter flask cooled in ice-water as the receiver. The reaction mixture is heated to 186° C. with a heating mantle so that all reactants are in the liquid state. Then 2.5 cc (0.002305 mole catalyst) of the above-molten $KBH_4$-phenol solution was added with a warmed syringe under a blanket of dry nitrogen. Phenol is removed steadily over about 3 hours at 190° to 255° C. and under vacuum applied gradually down to about 1 mm Hg. The clear light yellow prepolymer is then poured into a aluminum foil-lined glass tray. Intrinsic viscosity is 0.19 dl/g (sym.-tetrachloroethane, 30° C.). The prepolymer is very light, slightly hazy and brittle. 798.1 Grams of phenol is collected in the receiver.

C. Polymerization

The above prepolymer is crushed and 1500 gm charged to a 2-gallon, oil-heated, stirred reactor. The reactor is put under a blanket of nitrogen and left to sit overnight.

Vacuum is applied to the reactor. The reaction mixture is heated to 290° C. over 2.1 hours (stirring at 5 rpm began at 1.0 hour and 139° C.) at which point the vacuum is 0.6 mm Hg. The polymerization is continued under these conditions (temperature about 295° C., 0.6 mm, 5 rpm) for 4.3 hours. Then the reactor is opened and the viscous, light yellow, clear polymer removed. When cool, the polymer is clear and very tough and has an intrinsic viscosity of 0.61 (sym-tetrachloroethane, 30° C.).

EXAMPLES 2 to 5

The process of Example 1 is repeated using different catalysts and conditions which are set forth in Table 1, together with the intrinsic viscosities of the resulting polyester products.

TABLE 1

| | Catalyst Preparation | | | | | | Prepolymer Preparation | | Polymer Preparation | |
|---|---|---|---|---|---|---|---|---|---|---|
| Example | Catalyst Ingredient | Solvent | Time to Dissolve | Temp. °C. | Conc. Equiv. per cc. Solution | Nominal Catalyst | Catalyst Level(2) | Intrinsic Viscosity(3) | Time (hrs) at 290–300° C. | Intrinsic Viscosity(3) |
| 1 | $KBH_4$ | Phenol | 2.5 hr. | 39–71 | 0.00093 | Potassium Borophenoxide | 0.05 | 0.19 | 4.3 | 0.61 |
| 2 | Lithium | Phenol Tetrahydrofuran(1) | 2.0 hr. | Warmed | 0.00051 | Lithium Phenoxide | 0.05 | 0.15 | 7.2 | 0.62 |
| 3 | NaOH | Phenol | 35 min. | Room Temp. to 130° C. | 0.00050 | Sodium Phenoxide | 0.05 | 0.17 | 6.0 | 0.57 |
| 4 | $K_2CO_3$ | Phenol | 50 min. | Room Temp. to 132° C. | 0.00050 | Potassium Phenoxide | 0.05 | 0.17 | 5.0 | 0.63 |
| 5 | $Rb_2CO_3$ | Phenol | 17 min. | Room Temp. to 100° C. | 0.00050 | Rubidium Phenoxide | 0.05 | 0.17 | 3.5 | 0.65 |

(1) 1521.2 ml. THF and 284 g. phenol
(2) mole percent based on moles bisphenol A
(3) dl./g. measured in sym. tetrachloroethane at 30° C.

Examples 6 to 10 compare the results of adding the catalyst before melting the reactants (Examples 6 and 7)

with the inventive step of concurrent addition of catalyst and liquid reactants.

EXAMPLE 6

0.0500 mole (5.21 gm) neopentyl glycol, 0.0513 mole (11.60 gm) bisphenol-A and 0.1000 mole (31.80 gm) diphenyl terephthalate are charged to a small glass tube shaped reactor (with oil-heated jacket) with a gas inlet, a mechanically driven glass stirrer with a flat, circular tip and a curved tube leading to a trap. The system is put under nitrogen blanket. 0.3 cc (0.00015 mole) of a solution of lithium metal in phenol-tetrahydrofuran solvent is added to the reaction mixture and the mixture heated to 230° C. with stirring. Vacuum is applied gradually over about one hour at 230° C. to 0.15 mm Hg then heated for an additional 30 minutes at about 0.13 mm. The product is then removed from the reactor. It is light in color with a slight haze, but has some dark particles in it.

EXAMPLE 7

The reaction is set up and then heated to 230° C. as above and checked for appearance. Black particles are observed floating in the melted monomers and the run is terminated.

EXAMPLE 8

The monomers are charged as above but not the catalyst. The reaction mixture was heated to 210° C. and then the catalyst is added to the molten reactants and the polymerization begun. Phenol is removed over 1.25 hours with increasing vacuum at 230° to 240° C. and the product is clear (slight haze), light yellow. No black specks are observed. Intrinsic viscosity of the polymer is 0.33 dl/g (sym-tetrachloroethane, 30° C.).

A thin film polymerization is run by distributing 0.7 gm of the above prepolymer (0.33 dl/g) around the bottom of a 250 cc round-bottom flask and heating in an oil bath at 310° C. for 10 minutes at about 0.1 mm Hg. The resulting polymer is scraped out of the flask while still soft. It is clear, light yellow and tough, with intrinsic viscosity of 0.59 dl/g (sym-tetrachloroethylene @ 30° C.).

EXAMPLE 9

Using 0.10 mole (22.81 gm) bisphenol A, 0.050 mole (15.92 gm) diphenyl isophthalate and 0.50 mole (15.92 gm) diphenyl terephthalate are charged to the reactor as above and melted at 210° C. and then 0.3 cc catalyst solution is added and the polymerization carried out as above. No black specks are observed. The product had the following properties:

| | |
|---|---|
| Prepolymer; | clear, light yellow, 0.27 dl/g |
| Polymer; | clear, light yellow, 0.93 dl/g after 10 min. 310° C. |
| | clear, light yellow, 1.23 dl/g after 30 min. 310° C. |

EXAMPLE 10

The process is repeated as in Example 9 using 0.1 cc catalyst solution. The following results are obtained:

| | | |
|---|---|---|
| Prepolymer; | light, cloudy, | 0.29 dl/g |
| Polymer; | light, slightly hazy | 0.58 dl/g after 30 min. 310° C. |
| | light, slightly hazy | 0.74 dl/g after 30 min. 310° C. |

EXAMPLE 11

Following describes the process of the invention using the semi-continuous mode described in FIGS. 1 and 2 of the drawing:

In an agitated 10 gallon melt tank, equipped with a turbine agitator and inert gas supply, 60.65 g-moles diphenyl isophthalate, 20.25 g-moles of diphenyl terephthalate and 81.25 g-moles of bisphenol A are melted. This and all subsequent vessels/reactors are heated by circulating hot oil (Therminol 66) in their jackets in a controlled manner. Internal temperature of this melt tank is maintained at 180° C.±5° C. A slow stream of dry nitrogen was purged through the melt tank throughout the run. The molten monomers are then transferred to a 10 gallon stainless steel stirred tank reactor. The transfer is done by pressuring the melt tank to 2–3 atm gauge and opening a bottom valve. A liquid catalyst for the process was prepared by forming a solution by reacting $KBH_4$ with purified phenol. The resulting catalyst solution was employed at the level of 0.05 mol percent by $KBH_4$ based on the moles of bisphenol A. The catalyst is added to the stirred tank reactor in a liquid form. The internal temperature of the reactor is increased to 280° C. over a period of 2 hours and 15 minutes, while at the same time the internal pressure is reduced to 70 mm Hg. During this time the by-product phenol is continuously distilled off. At the end of this reaction time, a sample is collected and the intrinsic viscosity determined to be 0.175±0.005 dl/g. The material is then transferred to a stirred surge tank by pressurizing the reactor and opening the bottom valve. The holding tank is maintained at atmospheric pressure and 260°±5° C. and under constant nitrogen purge. The prepolymer is then continuously fed through a metering gear pump to the top feed port of a filmtruder, type HM, with a 5.4 square feet of heating surface, from Luwa Corp. The internal temperature, pressure and rotor speed maintained in this first filmtruder is 295° C., 4 mm Hg. and 140 rpm, respectively. The material is continuously pumped out of the bottom and fed to a second filmtruder of type HS of the same size. The internal temperature, pressure and rotor speed in the second filmtruder is maintained at 305° C., 1 mm Hg. and 100 rpm, respectively. Under these conditions and at a capacity of 20 lbs. per hour a polyester with a weight average molecular weight of 27,800 and polydispersity of 2.2 is produced.

The properties of the polyester product are as follows:

| | |
|---|---|
| Tensile Strength, psi | 10158 |
| Tensile Modulus, psi | $3.44 \times 10^5$ |
| Elongation at yield, percent | 7.3 |
| Heat Distortion Temperature (unannealed) °C., 264 psi | 155.6 |
| Izod Impact Strength ft/lb/inch of notch | 4.8 |
| Intrinsic Viscosity dl/g in symtetrachloroethane @ 30° C. | 0.51 |
| Yellowness Index | ca 27 |

EXAMPLE 12

Following describes the process of the invention using the continuous mode as described in FIGS. 2 and 3 of the drawing.

An essentially stoichiometric mix of reactants is continuously charged to the melt tank, and oxygen is excluded by suitable purging with nitrogen. A catalyst solution is prepared as in Example 11 and introduced to the first stirred reactor together with the liquid monomers. The reaction is conducted in the four reactors listed in Table 2 which are operated in series. Table 2 summarizes conditions used in each reactor at steady state.

TABLE 2

REACTOR SUMMARY

| TYPE | % PHENOL REMOVAL | MELT VISCOSITY, CP | TEMP. °C. | PRESSURE mmHgA | MEAN RESIDENCE TIME, HR |
|---|---|---|---|---|---|
| Melt Tank | 0 | 50 | 200 | 758 | 1.5 |
| Stirred Reactor 20 | 60.0 | 1,000 | 240 | 200 | 1 |
| Stirred Reactor 45 | 31.2 | 10,000 | 280 | 20 | 1 |
| Wiped Film 48 | 4.4 | 200,000 | 302 | 2 | — |
| Wiped Film 66 | 2.0 | 4,000,000 | 320 | 0.4 | — |

Also included in Table 2 are the sequential degrees of phenol removal which are effected in each reactor. The process produces about 20 pounds per hour of polyester having a final product I.V. of about 0.60 to 0.65 dl/g (sym-tetrachloroethane @ 30° C.).

The foregoing examples are intended to be illustrative and not to limit the invention. The various embodiments disclosed in this specification are meant to illustrate the invention and many other alternatives and embodiments are deemed to fall within the scope of this invention.

Unless otherwise indicated in this specification and claims, temperatures are in degrees Centigrade and parts are by weight.

We claim:

1. In the process of preparing a linear aromatic polyester by transesterification melt polymerization of monomer reactants consisting essentially of a bisphenol and a diaryl ester of a dicarboxylic acid in a polymerization reaction zone which comprises reacting said bisphenol and said diaryl ester in a first reaction stage of said zone to prepare a polyester oligomer, and thereafter continuing the reaction in a second reaction stage of said zone to produce the polyester product, the improvement wherein the polymerization is carried out in the first reaction stage either batchwise or substantially continuously, and the polymerization is continued in the second reaction stage substantially continuously, with the provision that when the polymerization in the first reaction stage is carried out batchwise, the polymerization in the second stage is carried out in a wiped film reaction zone.

2. The process of claim 1 wherein the polymerization is conducted in the presence of a catalyst that is normally solid at 30° C. but which is introduced to the polymerization process in liquid form.

3. The process of claims 1 or 2 wherein the wiped film reaction zone provides for countercurrent flow of the reaction mixture and the vapor by-product of the reaction.

4. The process of claims 1 or 2 wherein the bisphenol is bisphenol A.

5. The process of claims 1 or 2 wherein the diaryl ester is diphenyl isophthalate, diphenyl terephthalate or a mixture thereof.

6. The process of claims 1 or 2 wherein the liquid catalyst is a normally solid material in molten form or a normally solid material in solution in a solvent for the catalyst.

7. The process of claim 6 wherein the liquid catalyst is a solution of a metal phenoxide in phenol.

8. The process of claim 7 wherein the metal phenoxide is potassium phenoxide.

9. The process of claim 7 wherein the metal phenoxide is rubidium phenoxide.

10. The process of claim 7 wherein the metal phenoxide is lithium phenoxide.

11. The process of claim 7 wherein the metal phenoxide is sodium phenoxide.

12. The process of claim 6 wherein the liquid catalyst is the reaction product of potassium borohydride and phenol.

13. In the process of preparing a linear aromatic polyester by transesterification melt polymerization of monomer reactants consisting essentially of a bisphenol and a diaryl ester of a dicarboxylic acid in a polymerization reaction zone, the improvement which comprises introducing said reactants substantially continuously to said polymerization reaction zone, and withdrawing said polyester product substantially continuously from the polymerization zone.

14. The process of claim 13 wherein the bisphenol is bisphenol A.

15. The process of claim 13 wherein the diaryl ester is diphenyl isophthalate, diphenyl terephthalate or a mixture thereof.

16. In the process of preparing a linear aromatic polyester by transesterification melt polymerization of monomer reactants consisting essentially of a bisphenol and a diaryl ester of a dicarboxylic acid in the presence of a basic catalyst for the polymerization in a polymerization reaction zone, the improvement which comprises introducing said monomer reactants and a basic catalyst that is normally solid at 30° C., in liquid form substantially continuously to said polymerization reaction zone, and withdrawing the polyester product substantially continuously from the polymerization zone.

17. The process of claim 16 wherein the bisphenol is bisphenol A.

18. The process of claim 16 wherein the diaryl ester is diphenyl isophthalate, diphenyl terephthalate or a mixture thereof.

19. The process of claim 16 wherein the liquid catalyst is a normally solid material in molten form or a normally solid material in solution in a solvent for the catalyst.

20. The process of claim 19 wherein the liquid catalyst is a solution of a metal phenoxide in phenol.

21. The process of claim 20 wherein the metal phenoxide is potassium phenoxide.

22. The process of claim 20 wherein the metal phenoxide is rubidium phenoxide.

23. The process of claim 20 wherein the metal phenoxide is lithium phenoxide.

24. The process of claim 20 wherein the metal phenoxide is sodium phenoxide.

25. The process of claim 19 wherein the liquid catalyst is the reaction product of potassium borohydride and phenol.

26. In the process of preparing a linear aromatic polyester by transesterification melt polymerization of monomer reactants consisting essentially of a bisphenol and a diaryl ester of a dicarboxylic acid in a polymerization zone, said zone comprising a series of at least two reaction stages,
the improvement which comprises carrying out the polymerization reaction continuously in a film reactor in the final polymerization reaction stage, in a wiped film reaction zone.

27. The process of claim 26 wherein the wiped film reaction zone provides for countercurrent flow of the reaction mixture and the vapor by-product of the reaction.

28. The process of claim 26 wherein the bisphenol is bisphenol A.

29. The process of claim 26 wherein the diaryl ester is diphenyl isophthalate, diphenyl terephthalate or a mixture thereof.

30. In the process of preparing a linear aromatic polyester by transesterification melt polymerization of monomer reactants consisting essentially of a bisphenol and a diaryl ester of a dicarboxylic acid in the presence of a basic catalyst for the polymerization reaction,
the improvement which comprises introducing a basic catalyst that is normally solid at 30° C., to the polymerization reaction in liquid form, said polymerization reaction being carried out in a polymerization zone which comprises a series of at least two reaction stages wherein the polymerization reaction in the final reaction stage of said series is carried out continuously in a wiped film reaction zone.

31. The process of claim 30 wherein the wiped film reaction zone provides for countercurrent flow of the reaction mixture and the vapor by-product of the reaction.

32. The process of claim 30 wherein the bisphenol is bisphenol A.

33. The process of claim 30 wherein the diaryl ester is diphenyl isophthalate, diphenyl terephthalate or a mixture thereof.

34. The process of claim 30 wherein the liquid catalyst is a normally solid material in molten form or a normally solid material in solution in a solvent for the catalyst.

35. The process of claim 30 wherein the liquid catalyst is a solution of a metal phenoxide in phenol.

36. The process of claim 35 wherein the metal phenoxide is potassium phenoxide.

37. The process of claim 35 wherein the metal phenoxide is rubidium phenoxide.

38. The process of claim 35 wherein the metal phenoxide is lithium phenoxide.

39. The process of claim 35 wherein the metal phenoxide is sodium phenoxide.

40. The process of claim 34 wherein the liquid catalyst is the reaction product of potassium borohydride and phenol.

41. In the process of preparing a linear aromatic polyester by transesterification melt polymerization of monomer reactants consisting essentially of a bisphenol and a diaryl ester of a dicarboxylic acid in the presence of a basic catalyst for said polymerization wherein said reactants are introduced to the polymerization reaction in the liquid state,
the improvement which comprises introducing a basic catalyst that is normally solid at 30° C., in liquid form to the polymerization reaction substantially concurrently with introduction of the liquid state reactants to the polymerization, and introducing the catalyst and reactants to the polymerization reaction substantially continuously and withdrawing the polyester product from the polymerization reaction substantially continuously.

42. The process of claim 41 wherein at least one reactant is melted prior to mixing with the catalyst.

43. In the process of preparing a linear aromatic polyester by transesterification melt polymerization of monomer reactants consisting essentially of a bisphenol and a diaryl ester of a dicarboxylic acid in the presence of a basic catalyst for said polymerization wherein said reactants are introduced to the polymerization reaction in the liquid state,
the improvement which comprises introducing a basic catalyst that is normally solid at 30° C., in liquid form to the polymerization reaction substantially concurrently with introduction of the liquid state reactants to the polymerization, wherein the polymerization reaction is carried out in a polymerization zone which comprises a series of at least two reaction stages wherein the polymerization reaction in the final stage of the series is carried out continuously in a wiped film reaction zone.

44. The process of claim 43 wherein the first stage of the reaction is carried out batchwise.

45. The process of claim 41 wherein the polymerization reaction is carried out in a polymerization zone which comprises a series of at least two reaction stages wherein the polymerization reaction in the final stage of the series is carried out continuously in a wiped film reaction zone.

46. The process of claims 41, 42, 43, 44 or 45 wherein the liquid catalyst is a normally solid material in molten form or a normally solid material in solution in a solvent for the catalyst.

47. The process of claim 46 wherein the liquid catalyst is a solution of a metal phenoxide in phenol.

48. The process of claim 47 wherein the liquid catalyst is the reaction product of potassium borohydride and phenol.

49. The process of claims 45, 47 or 48 wherein the bisphenol is bisphenol A.

50. The process of claim 49 wherein the diaryl ester is diphenyl isophthalate, diphenyl terephthalate or mixtures thereof.

51. In the process of preparing a linear aromatic polyester by transesterification melt polymerization of monomer reactants consisting essentially of a bisphenol and a diaryl ester of a dicarboxylic acid in the presence of a basic catalyst for said polymerization wherein said reactants are introduced to the polymerization reaction in the liquid state, the improvement which comprises introducing the catalyst and liquid state reactants substantially concurrently and continuously to a polymerization zone and withdrawing said polyester product substantially continuously from said polymerization zone.

52. The process of claim 51 wherein the polymerization reaction is carried out in a polymerization zone which comprises a series of at least two reaction stages wherein the polymerization reaction in the final stage of the series is carried out continuously in a wiped film reaction zone.

53. The process of claim 52 wherein the first stage of the reaction is carried out batchwise.

54. The process of claims 51, 52 or 53 wherein the liquid catalyst is a normally solid material in molten form or a normally solid material in solution in a solvent for the catalyst.

55. The process of claim 54 wherein the liquid catalyst is a solution of a metal phenoxide in phenol.

56. The process of claim 55 wherein the liquid catalyst is the reaction product of potassium borohydride and phenol.

57. The process of claim 51, 55 or 56 wherein the bisphenol is bisphenol A.

58. The process of claim 57 wherein the diaryl ester is diphenyl isophthalate, diphenyl terephthalate or mixtures thereof.

59. In the process of preparing a linear aromatic polyester by transesterification melt polymerization of monomer reactants consisting essentially of a bisphenol and a diaryl ester of a dicarboxylic acid in the presence of a basic catalyst for said polymerization wherein said reactants are introduced to the polymerization reaction in the liquid state, the improvement which comprises introducing the catalyst to the polymerization substantially concurrently with introduction of the reactants to the polymerization, said polymerization reaction being carried out in a polymerization zone which comprises a series of at least two reaction stages wherein the polymerization reaction in the final stage of said series is carried out continuously in a wiped film reaction zone.

60. The process of claim 59 wherein the first stage of the reaction is carried out batchwise.

61. The process of claims 59 or 60 wherein the liquid catalyst is a normally solid material in molten form or a normally solid material in solution in a solvent for the catalyst.

62. The process of claim 61 wherein the liquid catalyst is a solution of a metal phenoxide in phenol.

63. The process of claim 62 wherein the liquid catalyst is the reaction product of potassium borohydride and phenol.

64. The process of claims 59, 62 or 63 wherein the bisphenol is bisphenol A.

65. The process of claim 64 wherein the diaryl ester is diphenyl isophthalate, diphenyl terephthalate or mixtures thereof 66. The process of claims 27, 30, 43, 45, 52, or 59 wherein said wiped film reaction zone provides for countercurrent flow of the reaction mixture and the vapor by-product of the reaction.

67. The product of the process of claim 1.
68. The product of the process of claim 2.
69. The product of the process of claim 13.
70. The product of the process of claim 16.
71. The product of the process of claim 26.
72. The product of the process of claim 30.
73. The product of the process of claim 41.
74. The product of the process of claim 43.
75. The product of the process of claim 45.
76. The product of the process of claim 51.
77. The product of the process of claim 59.

* * * * *